(12) United States Patent
Stone et al.

(10) Patent No.: US 9,924,762 B2
(45) Date of Patent: Mar. 27, 2018

(54) LAMINATE AND METHOD FOR MAKING LAMINATE

(71) Applicant: NIKE, Inc., Beaverton, OR (US)

(72) Inventors: N. Spencer Stone, Portland, OR (US); Sui-Chieh Yu, Portland, OR (US); Denis Schiller, Vancouver, WA (US); Ruzica Krstic, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/073,206

(22) Filed: Mar. 17, 2016

(65) Prior Publication Data

US 2016/0192734 A1 Jul. 7, 2016

Related U.S. Application Data

(62) Division of application No. 13/951,960, filed on Jul. 26, 2013, now Pat. No. 9,321,200, which is a division
(Continued)

(51) Int. Cl.
*A43B 13/04* (2006.01)
*A43B 7/14* (2006.01)
(Continued)

(52) U.S. Cl.
CPC .............. *A43B 13/04* (2013.01); *A43B 7/144* (2013.01); *A43B 7/1425* (2013.01);
(Continued)

(58) Field of Classification Search
CPC ....... A43B 13/04; A43B 13/12; A43B 13/223; A43B 13/122; A43B 13/141; A43B 13/26;
(Continued)

(56) References Cited

U.S. PATENT DOCUMENTS

| 4,847,141 A | 7/1989 | Pazos et al. |
| 5,477,577 A | 12/1995 | Hadley |

(Continued)

FOREIGN PATENT DOCUMENTS

WO 2005090062 A1 9/2005

OTHER PUBLICATIONS

Jul. 6, 2009—(WO) International Search Report—App PCT/US2008/001735.

(Continued)

*Primary Examiner* — Yogendra Gupta
*Assistant Examiner* — Ninh Le
(74) *Attorney, Agent, or Firm* — Banner & Witcoff, Ltd.

(57) ABSTRACT

A method of insert molding comprises placing in a first mold a curable rubber composition comprising a reactive species; placing on a surface of the rubber composition a first thermoplastic material in a film or layer comprising a group reactive with the reactive species of the rubber composition; curing the rubber composition in the mold to form a first molded article of cured rubber having a first thermoplastic material layer covalently bonded through reactive of the reactive species and the group; placing the first molded article as an insert into a second mold, the cured rubber contacting an inside surface of the second mold and the thermoplastic layer facing into the second mold cavity; closing the second mold and injecting into the second mold a second thermoplastic material that to form a second molded article comprising the first molded article thermally welded and/or covalently bonded to the second thermoplastic material.

6 Claims, 3 Drawing Sheets

Related U.S. Application Data of application No. 12/751,481, filed on Mar. 31, 2010, now Pat. No. 8,524,131, which is a division of application No. 11/705,169, filed on Feb. 9, 2007, now Pat. No. 7,810,252.

(51) Int. Cl.

| | | |
|---|---|---|
| *A43B 13/14* | (2006.01) | |
| *A43B 13/26* | (2006.01) | |
| *B29C 45/14* | (2006.01) | |
| *B29D 35/14* | (2010.01) | |
| *B32B 25/08* | (2006.01) | |
| *C08J 5/12* | (2006.01) | |
| *A43B 13/12* | (2006.01) | |
| *B29D 35/00* | (2010.01) | |
| *A43B 13/22* | (2006.01) | |
| *B32B 27/08* | (2006.01) | |
| *B32B 3/08* | (2006.01) | |
| *B32B 3/30* | (2006.01) | |
| *B32B 7/10* | (2006.01) | |
| *B32B 7/12* | (2006.01) | |
| *A43B 13/16* | (2006.01) | |
| *B29C 39/02* | (2006.01) | |
| *B29C 43/14* | (2006.01) | |
| *B29C 35/02* | (2006.01) | |
| *B29K 9/06* | (2006.01) | |
| *B29K 21/00* | (2006.01) | |
| *B29K 67/00* | (2006.01) | |
| *B29K 75/00* | (2006.01) | |
| *B29K 621/00* | (2006.01) | |
| *B29K 105/04* | (2006.01) | |

(52) U.S. Cl.
CPC ............ *A43B 7/1435* (2013.01); *A43B 13/12* (2013.01); *A43B 13/122* (2013.01); *A43B 13/141* (2013.01); *A43B 13/223* (2013.01); *A43B 13/26* (2013.01); *B29C 45/14* (2013.01); *B29C 45/14811* (2013.01); *B29D 35/0009* (2013.01); *B29D 35/142* (2013.01); *B32B 3/08* (2013.01); *B32B 3/30* (2013.01); *B32B 7/10* (2013.01); *B32B 7/12* (2013.01); *B32B 25/08* (2013.01); *B32B 27/08* (2013.01); *C08J 5/121* (2013.01); *A43B 13/16* (2013.01); *B29C 35/02* (2013.01); *B29C 39/025* (2013.01); *B29C 43/146* (2013.01); *B29K 2009/06* (2013.01); *B29K 2021/00* (2013.01); *B29K 2067/06* (2013.01); *B29K 2075/00* (2013.01); *B29K 2105/04* (2013.01); *B29K 2621/00* (2013.01); *B32B 2250/03* (2013.01); *B32B 2250/24* (2013.01); *B32B 2274/00* (2013.01); *B32B 2437/02* (2013.01); *Y10T 428/22* (2015.01); *Y10T 428/23* (2015.01); *Y10T 428/31551* (2015.04); *Y10T 428/31826* (2015.04)

(58) Field of Classification Search
CPC ....... A43B 13/16; A43B 7/1425; A43B 7/144; B32B 3/30; B32B 3/08; B32B 7/10; B32B 7/12; B32B 27/08; B32B 25/08; B32B 2274/00; B32B 2250/03; B32B 2250/24; B32B 2437/02; B29C 45/14; B29C 45/14811; B29C 35/02; B29C 39/025; B29C 43/146; B29D 35/0009; B29D 35/142; C08J 5/121; B29K 2105/04; B29K 2009/06; B29K 2021/00; B29K 2067/06; B29K 2075/00; B29K 2621/00; Y10T 428/31551; Y10T 428/31826; Y10T 428/22; Y10T 428/23

See application file for complete search history.

(56) References Cited

U.S. PATENT DOCUMENTS

| | | |
|---|---|---|
| 5,709,954 A | 1/1998 | Lyden et al. |
| 5,786,057 A | 7/1998 | Lyden et al. |
| 5,843,268 A | 12/1998 | Lyden et al. |
| 5,906,872 A | 5/1999 | Lyden et al. |
| 6,004,422 A | 12/1999 | Janovec et al. |
| 6,007,748 A | 12/1999 | Krajcir |
| 6,092,309 A | 7/2000 | Edwards |
| 6,749,781 B1 | 6/2004 | Maurer |
| 7,028,418 B1 | 4/2006 | Huang |
| 2004/0000255 A1 | 1/2004 | Hernandez |
| 2004/0026820 A1 | 2/2004 | Lorenzin |
| 2005/0217142 A1* | 10/2005 | Ellis, III ............ A43B 3/0005 36/25 R |
| 2010/0251567 A1 | 10/2010 | McInnis et al. |
| 2011/0072686 A1 | 3/2011 | Chen |

OTHER PUBLICATIONS

Aug. 11, 2009—(WO) Written Opinion of the International Searching Authority—App PCT/US2008/001735.
Aug. 11, 2009—(WO) International Preliminary Report on Patentablility—App PCT/US2008/001735.

\* cited by examiner

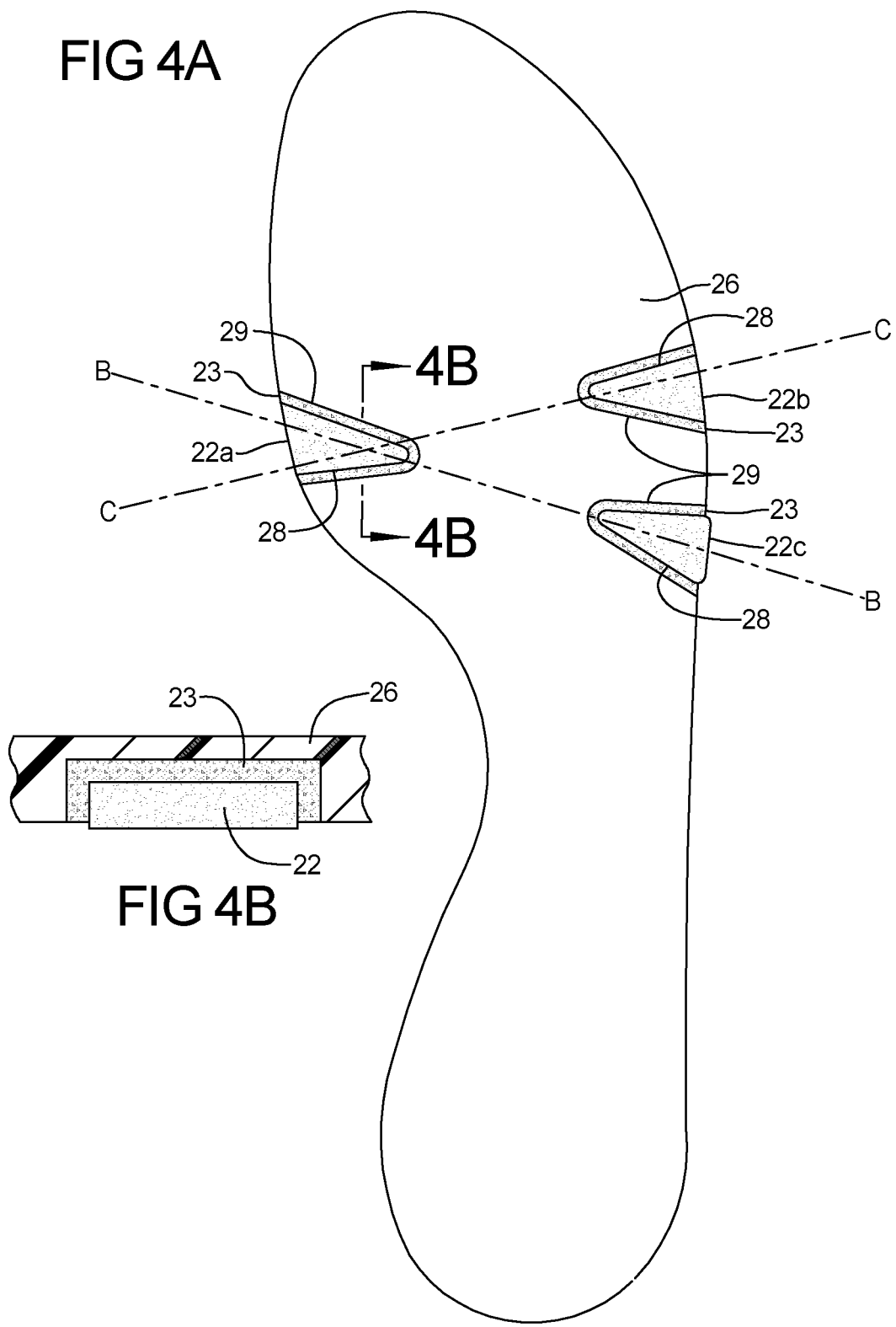

LAMINATE AND METHOD FOR MAKING LAMINATE

This application is a divisional of U.S. patent application Ser. No. 13/951,960, filed Jul. 26, 2013, which is a divisional of U.S. patent application Patent Application Ser. No. 12/751,481, filed Mar. 31, 2010, now U.S. Pat. No. 8,524,131, issued Sep. 3, 2013, which is a divisional of U.S. patent application Ser. No. 11/705,169, filed Feb. 9, 2007, now U.S. Pat. No. 7,810,252, issued Oct. 12, 2010, all of which are incorporated herein by reference, each in its entirety.

FIELD

The present disclosure relates to methods of adhering together layers of rubber and thermoplastic polymer during insert injection molding and molded articles containing both rubber and thermoplastic materials.

BACKGROUND

The statements in this section merely provide background information related to the present disclosure and may not constitute prior art.

It is sometimes desirable to combine two polymeric materials into an article to take advantage of properties of each of the materials, such as an elastic material and an inelastic material or a thermoplastic material and a thermoset material. Lyden et al., U.S. Pat. Nos. 5,906,872, 5,843,268, 5,786,057, and 5,709,954 disclose chemically bonding a rubber and a plastic in making, for example, a footwear outsole, by molding the plastic into a first piece and then molding and curing the rubber in the presence of the molded plastic piece. It is important in this process for the melt temperature of the plastic to be higher than the rubber curing temperature to prevent deformation of the molded plastic insert piece during rubber molding and curing. There are many plastics unsuitable for this process due to lower melting or softening points than can withstand the rubber processing conditions.

Hernandez, US Patent Application Publication No. 2004/0000255 describes forming a foamed cushion pad from a mixture of SBS (styrene-butadiene-styrene copolymer), EVA (ethylene-vinyl acetate copolymer), filler, curing agent, and a blowing agent, then inserting the foam pad into a recess of the upper mold in forming an outsole. The outsole compound is 50-100 wt % SBS and 45-60 wt % EVA, filler, curing agent, and a processing oil. Peroxide is used as curing agent for both the cushion pad and the outsole.

Lorenzin, US Patent Application Publication No. 2004/0026820 describes a process for manufacturing a sole in which a vulcanized rubber (NBR) containing a small amount of an acrylic resin with hydroxyl functionality and a hydrocarbon resin is cured in a mold to form a tread sole. A two-component polyurethane is then injected and cured to form a mid-sole. The publication postulates "mating" because the rubber surface retains "many free bonds" after vulcanization, impliedly from the hydroxyl acrylic resin.

Finally, Krajcir, U.S. Pat. No. 6,007,748 discloses a method of making a molded laminate sole for footwear in which a first heat curable material is placed in a mold, a second polymerizable material is injected to fill the remainder of the mold cavity, and polymerization of the second material generates heat that cures the first material. The document discloses foamable, polymerizable polyurethane, synthetic rubber, and PVC as suitable for the second material and mentions vulcanizable rubber as the first material.

There remains a need for an effective way to assure good adhesion of a thermoplastic layer to a cured rubber layer in a composite of such layers, such as is used as a sole assembly for footwear, without the disadvantages of using adhesives or the limitations on selection of thermoplastics used as an insert in molding rubber compositions.

SUMMARY

A method of insert molding comprises placing in a first mold a curable (i.e., still uncured) rubber composition comprising a reactive species; placing on a surface area (that is, on an area facing into the mold cavity) of the rubber composition a thermoplastic film or layer comprising a group reactive with the reactive species of the rubber composition; curing the rubber composition in the mold to form a first molded article of cured rubber having a thermoplastic layer covalently bonded through reaction of the reactive species and the group; placing the first molded article into a second mold, the cured rubber contacting an inside surface of the second mold and the thermoplastic layer facing into the second mold cavity; closing the second mold and injecting into the second mold a thermoplastic material that is at a temperature above the softening point of the thermoplastic layer to form a second molded article comprising the first molded article. The reactive species may be covalently attached to a polymer of the rubber composition, may be a reactive group of a compound that covalently bonds to the rubber during curing of the rubber composition, or may be a reactive group generated during curing of the rubber that covalently attaches the thermoplastic layer to the cured rubber.

In one embodiment of this method, the reactive species in the rubber composition is a peroxide or sulfur curing agent and the thermoplastic polymer group reactive with the reactive species is an ethylenically unsaturated group, carbonyl group, urethane group, urea group, thiocarbonyl group, cyano group, strained hetero ring such as an epoxide or aziridine ring, or a reactive alpha hydrogen.

In a second embodiment, the thermoplastic material comprises a coupling agent such as an aminosilane, zirconate, or titanate coupling agent reactive with a group in the rubber composition.

A method of preparing a molded article comprises placing in a mold a rubber insert having a surface layer comprising a thermoplastic elastomer, wherein a rubber surface of the insert is adjacent to a mold surface and the surface layer of the insert extends into a mold cavity; closing the mold and injecting into the mold a thermoplastic material; and cooling the thermoplastic material to form a molded article comprising the insert.

These methods make composite thermoplastic/rubber articles without using adhesives, providing a simpler process and potentially more durable article. Such articles may be used in the manufacture of footwear, for example. One article provided is an outsole for footwear, in which one or more rubber elements are incorporated at desired locations. In an embodiment of this method and article, an outsole of an article of footwear is prepared comprising a rubber material and a thermoplastic material bonded to one another through an intervening thermoplastic layer, the intervening thermoplastic layer being covalently bonded to the rubber layer. The rubber is located in one or more regions to provide desirable physical and mechanical properties to the outsole. As an example, the rubber may be located in specific areas along the length of the outsole to improve traction during use of the footwear, or the rubber may be inserted in an area across the width of the outsole to increase flexibility at that point of the outsole. Wherever located, the adhesion between the thermoplastic and rubber elements of the outsole must be strong.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3A:
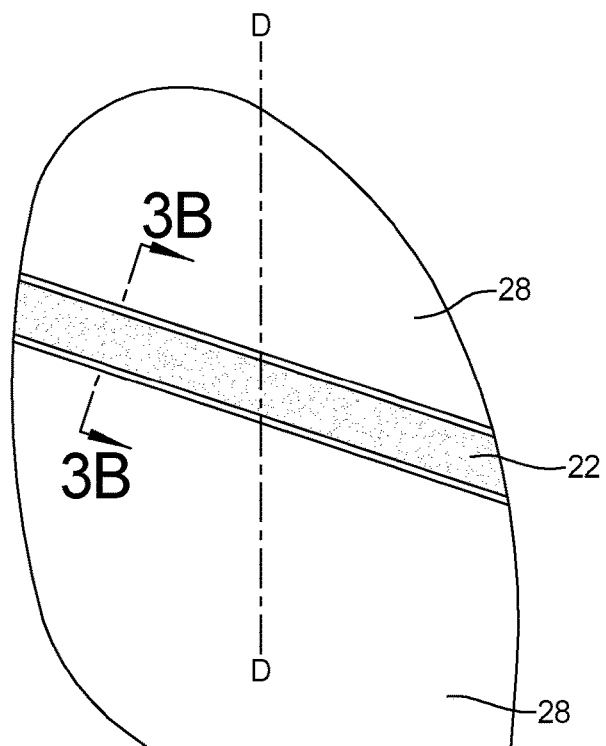
Figure 3B:
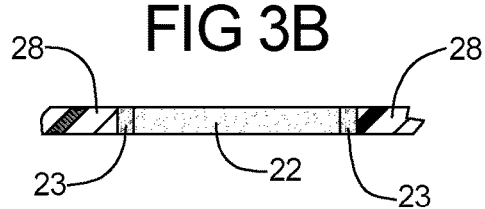
Figure 3C:
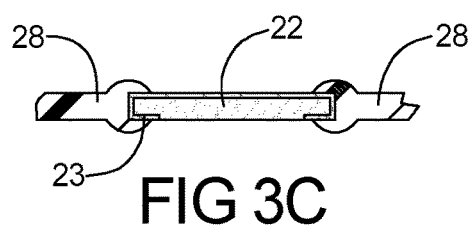

FIG. 3A is a plan view of a footwear outsole showing a rubber segment located in an area underlying the toes bonded to two thermoplastic portions comprising the rest of the outsole; FIG. 3B is a partial cross-sectional view along line 3B-3B of FIG. 3A; FIG. 3C is an alternative embodiment of a partial cross-sectional view along line 3B-3B of FIG. 3A; and FIG. 4A is a plan view of an alternate embodiment of a footwear outsole having wedge-shaped rubber segments bonded to a thermoplastic outsole at corresponding wedge-shaped notches therein so as to enhance the flexibility of the footwear outsole in at least one select area and along at least one select line of flexion such as lines B-B and C-C; FIG. 4B is a partial cross-sectional view along line C-C of FIG. 4A.

DETAILED DESCRIPTION

The following description is merely exemplary in nature and is not intended to limit the disclosed invention, its application, or its uses.

In a first embodiment of the method, a curable rubber composition is placed in a first mold and a film or layer of a first thermoplastic composition is placed on a surface of the rubber composition, then the mold is closed and the rubber composition is cured to form a molded rubber article having at a surface a covalently bonded layer of the first thermoplastic composition. Alternatively, the mold may be closed after the rubber composition is positioned, and the thermoplastic composition injected into the mold, then the mold heated to cure the rubber and cause covalent bonding of the thermoplastic composition to the rubber. The uncured rubber composition comprises a reactive species that reacts during the rubber curing cycle with a group of the thermoplastic composition to covalently bond the thermoplastic layer to the molded rubber article.

Curable rubber compositions contain a rubber resin and a curing agent, and may also contain an accelerator, a reinforcing material or filler such as silica, a processing oil for easier compounding and processing, and other optional additives. The rubber composition may contain curable natural or synthetic rubber, or mixtures of curable rubbers. The rubber materials may comprise homopolymers of conjugated diene monomers, copolymers of two or more conjugated dienes and copolymers of one of the dienes with a monoalkenyl arene, preferably in which the copolymer has predominantly conjugated diene units. The conjugated dienes preferably comprise from 4 to 8 carbon atoms. Nonlimiting examples of suitable conjugated diene monomers include butadiene, isoprene, 2,3-dimethyl-1,3-butadiene and piperylene. Nonlimiting types of rubber that may be used include styrene-butadiene rubber (SBR), polyisoprene rubbers including natural rubber (NR) and isoprene rubber (IR), polybutadiene rubber (BR), acrylonitrile-butadiene rubber (NBR), carboxylated nitrile rubber (XNBR), polychloroporene (neoprene), bromobutyl rubber, chlorosulfonated polyethylene, silicone rubber, ethylene-propylene rubbers (EPR, EPDM), and combinations of these. Other elastomers useful as rubber materials in the present invention include block copolymers comprising a relatively inelastic or "hard" phase and a relatively elastic or "soft" phase. The preparation of such block copolymers is known. See U.S. Pat. Nos. 4,174,358; 4,292,414; 4,783,503; 4,795,782; 4,797,447; 4,868,243; 4,868,245; 4,882,384; 4,898,914; and 4,906,687, the disclosures of which are herein incorporated by reference.

The rubber material may be chemically modified to facilitate the chemical bond between the first thermoplastic material and the rubber material. The rubber material may be modified by addition of a modifying agent to the base rubber that imparts the reactive species to the rubber material. The mode of such addition may be, for example, by means of a surface preparation or by dispersion within the rubber material. The reactive species may be incorporated into the rubber material is by reaction of, for instance, hydroxyl, carboxyl, amino, ester, ether and the like groups of the modifying agent. The modifying agent may react with the polymeric backbone of the rubber material or may react with a terminal group. For example, maleic anhydride, maleic acid, fumaric acid, or another unsaturated acid or anhydride may be added to the rubber to form an adduct with the ethylenic unsaturation present in the rubber material and impart carboxylic acid or anhydride functionality to the rubber that can be reacted under appropriate conditions with a group of the first thermoplastic composition to produce a chemical bond between the rubber and the first thermoplastic composition. See U.S. Pat. Nos. 3,887,527; 4,292,414; 4,427,828; 4,429,076; 4,578,429; 4,657,970; and 4,795,782, the disclosure of which are hereby incorporated by reference.

Reactive functionality, for example, carboxyl or anhydride groups, may be incorporated into the alkenylarene portion of the rubber material, such as those having no ethylenic unsaturation, or into both the alkenylarene portion and other portions thereof having ethylenic unsaturation. See U.S. Pat. Nos. 4,783,503; 4,797,447; 4,898,914; and 4,906,687, the disclosures of which are herein incorporated by reference.

The rubber material may be foamed or blown by use of foaming or blowing agents. Physical foaming and blowing agents function as gas sources by undergoing a change in the phase state. Suitable physical blowing and foaming agents may be selected from the group consisting of aliphatic hydrocarbons and their chloro- and fluoro-derivatives. Typical foaming and blowing agents may be selected from the group consisting of isomers of pentane, hexane, heptane, fluorocarbons, trichlorofluoromethane, dichlorodifluoromethane, dichlorotetrafluoroethane, monochlorodifluoromethane, methylene chloride, carbon dioxide, water and nitrogen. For example, water is a used as a blowing agent for microcellular polyurethane. Chemical foaming and blowing agents produce a gas via a chemical reaction. Suitable chemical foaming and blowing agents may be selected from the group consisting of sodium bicarbonate, dinitrosopentamethylene-tetramine, sulfonyl hydroxides, azodicarbonamide, p-toluenesulfonyl semicarbazide, 5-phenyltetrazole, diisopropylhydrazodicarboxylate and sodium borohydrite.

The thermal decomposition of the foaming or blowing agents can be lowered through addition of activators or accelerators. Water also may be employed as a blowing or foaming agent in the case of polyurethane-containing materials. The rubber material may be foamed or blown using these foaming and blowing agents by methods known in the art.

The rubber material may be modified by addition of functional moieties which provide carboxylic acid, amide, hydroxyl and other reactive functional groups. In some cases, preferred functional groups may be selected from the group consisting of amino groups, hydroxyl groups, thiol groups, carboxyl groups, anhydride groups, isocyanate groups, epoxide groups, silane groups, and groups derived therefrom such as urethane groups, ester groups, amide groups, and metal carboxylate groups.

Typically, solid rubber materials useful in footwear applications have a hardness within the range of 30-90 Shore A Durometer, per ASTM D-2240. Preferably, the solid rubber materials have a hardness within the range of from about 40-80 Shore A Durometer, and more preferably within the range of from about 50-70 Shore A Durometer. The modulus at 300% elongation of solid rubber materials useful in the footwear applications is from about 10 to about 90 kg/cm$^2$, per ASTM D-412. Preferably, the modulus at 300% elongation is within the range of from about 20-80 kg/cm$^2$, and more preferably from about 30 to about 70 kg/cm$^2$.

The hardness of a foamed or blown rubber material useful in the present methods and articles typically ranges from about 20 to about 90 Asker C Durometer, and the modulus of the foamed or blown rubber typically ranges from about 10 to about 90 kg/cm$^2$ at 150% elongation, from about 10 to about 80 kg/cm$^2$ at 200% elongation and from about 10 to about 60 kg/cm$^2$ at 300% elongation, per ASTM D-412. Preferably, the hardness of a foamed or blown rubber material ranges from about 50 to about 80 Asker C Durometer, and more preferably from about 40 to about 70 Asker C Durometer. Preferably, the modulus of the foamed or blown rubber ranges from about 10 to about 80 kg/cm$^2$ at 150% elongation, from about 20 to about 70 kg/cm$^2$ at 200% elongation and from about 10 to about 50 kg/cm$^2$ at 300% elongation. More preferably, the modulus of the foamed or blown rubber ranges from about 20 to about 60 kg/cm$^2$ at 150% elongation, from about 30 to about 60 kg/cm$^2$ at 200% elongation and from about 20 to about 40 kg/cm$^2$ at 300% elongation.

In preferred embodiments, the rubber resin contains less than 50% by weight natural rubber. In one embodiment the rubber is selected as one suitable for footwear outsoles. Athletic footwear have rubber outsoles that meet a variety of performance specifications. The outsoles are generally prepared from silica filled rubber compositions. To make the rubber resins compatible with the filler and improve the physical properties, silane coupling agents are commonly used.

The compositions may further contain a metal compound such as one selected from the group consisting of titanium or zirconium with one or more alkoxy groups bonded to the titanium or zirconium. Mixtures of such metal compounds may also be used. In some embodiments, the zirconium or titanium metal compound is a chelate. Although the curable rubber compositions preferably contain reinforcing fillers such as silica, in some embodiments, the compositions are essentially lacking in silane coupling agents. Mixtures of rubbers may also be used. Examples of rubbers useful in the invention include, without limitation, natural rubber such as those based on polyisoprene.

The rubber composition includes a curing agent such as a peroxide or sulfur compound. Conventional sulfur based curing agents may be used in the compositions. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio)benzothiazole, and thiuram compounds such as tetramethylthiuram disulfide, tetraethylthiuram disulfide and dipentamethylenethiuram tetrasulfide. The vulcanizing or curing agents may be used alone or in combination with each other. In a preferred embodiment, peroxide is used as the curing agent. The peroxide can be any organic peroxide that can decompose and yield free radicals capable of crosslinking the rubber resin. Typical methods used to induce peroxide decomposition to yield the free radicals include heat, visible light, ultraviolet light or other actinic radiation. For most rubber compounds, heat is a preferred method of inducing decomposition because the rubber composition tends to be opaque. However, in the case of clear rubbers, UV and visible light may be used to initiate the decomposition. Nonlimiting examples of suitable peroxides include dicumyl peroxide, benzoyl peroxide, bis(4-methylbenzoyl) peroxide, diisopropylbenzoyl peroxide, 1,1-di-(tert-butylperoxy)-3,3,5-trimethylcyclohexane, di-2,4-dichlorobenzoyl peroxide, and 2,5-dimethyl-2,5-di-(tert-butylperoxy)hexane. The amount of curing agent used in the rubber formulation may be at least about 0.01, preferably at least about 0.05 percent by weight of the rubber formulation. The amount of curing agent used in the rubber formulation may also be up to about 1.5, preferably up to about 1.0, more preferably up to about 0.3 percent by weight of the rubber formulation.

The rubber compositions may also, in general, contain accelerators when sulfur is used instead of peroxide as the curing agent. Such accelerators and co-accelerators are known in the art and include, without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethyl thiourea, tetrabenzyl thiuram disulfide, zinc-O—,O-di-n-butylphosphorodithiolate, and N-t-butyl-2-benzothiazylsulfenamide.

It may be desirable to provide rubber compositions that cure and can be processed with a minimum of emissions of potentially harmful by-products. In some embodiments, it is preferred to use accelerators and co-accelerators that are non-nitrosamine generators or non-carcinogenic nitrosamine generators. One such accelerator is tetrabenzylthiuram disulfide. It is known to generate a non-carcinogenic nitrosamine, N-nitrosodibenzylamine, which is not known to be carcinogenic according to published literature. A preferred co-accelerator is MBTS or 2,2'-dithiobisbenzothiazole.

The rubber composition includes at least one kind of reactive species that, under the molding conditions, forms a covalent bond between the cured rubber and the first thermoplastic composition by reaction with a group present in the first thermoplastic composition. In one embodiment, the reactive species comprises a radical generated from the curing agent (peroxide or sulfur compound) for the rubber, which reacts with a reactive group in the first thermoplastic composition selected from unsaturated carbon bonds such as vinyl groups, carbonyl groups such as those in urea, urethane, ketone, aldehyde, ester, and amide moieties, thiocarbonyl groups, cyano groups, epoxide groups or other strained rings with heteroatoms, and reactive alpha hydrogens. In one particular example, the first thermoplastic material comprises an addition polymerizable unsaturated group that is covalently bonded to the rubber during curing of the rubber. One such thermoplastic material containing polymerizable unsaturation is a millable polyurethane.

In another embodiment, the reactive species of the rubber composition comprises a group of a compound other than a curing agent in the rubber composition that reacts with a functionality in the first thermoplastic composition. Examples of such compounds that may be included in the rubber composition are amino functional silane coupling agents, described in more detail below, which have an amine group available for reaction with isocyanate, carboxyl, ester or amide groups in the first thermoplastic composition and silane groups that react with metal oxides such as silica fillers in the rubber composition. Other coupling agents such as zirconates and titanates may also be used. For example a coupling agent having a labile hydrogen, for example from an amine group, can react with an isocyanate group of the thermoplastic resin or can undergo a transesterification reaction with an ester or substitution at the linking oxygen of a urethane group to form an amide or urea group covalent bond with the first thermoplastic material. In a variation of this, the coupling agents may be included in the first thermoplastic composition for these reactions.

In another embodiment, the rubber composition may include a small amount of addition polymerizable monomer with reactive species such as carboxyl, anhydride groups, hydroxyl groups, isocyanate groups, epoxide groups, and so on that are incorporated into the rubber by the curing reaction and provide functionality at the interface of the rubber and thermoplastic portions for covalent bonding with complementary reactive groups in the first thermoplastic composition. Examples of such polymerizable monomers include, without limitation, vinyl monomers such as esters of α,β-ethylenically unsaturated monocarboxylic acids containing 3 to 5 carbon atoms such as acrylic, methacrylic, and crotonic acids and of α,β-ethylenically unsaturated dicarboxylic acids containing 4 to 6 carbon atoms; vinyl esters, vinyl ethers, vinyl ketones, vinyl aldehydes (enals), and aromatic or heterocyclic aliphatic vinyl compounds. Certain primary or secondary halo-functional alkanes or alkenes can be incorporated. It is also possible to incorporate a minor amount of a thermoplastic polymer that has such reactive species, such as polyurethanes, alkyds, polyesters, polyamides, poly(ether amides), epoxy resins, acetals, SAN, SEBS, and so on having carboxyl, hydroxyl, epoxide, isocyanate, and amino groups, ethylenic unsaturation, and so on.

The rubber compositions generally contain reinforcing fillers. Such fillers include silica, carbon black, clay, organic fiber, inorganic metal powder, mineral powder, talc, calcium sulfate, calcium silicate, and the like. Silica is preferred in some embodiments. Typical compositions for use in preparing molded rubber outsoles for athletic shoes may contain about 10 to about 60 parts per hundred by weight filler.

The rubber compositions may optionally contain a titanium or zirconium compound with at least one alkoxy group bonded to the metal atom, as described in Wilson III, U.S. Pat. No. 6,620,871. Mixtures of the zirconium and titanium compounds of the invention may also be used. Generally, the R group of the alkoxy group is an alkyl group having 8 or fewer carbon atoms. In a preferred embodiment, the R group contains 6 or fewer carbons, and more preferably contains 4 or fewer carbon atoms. Examples of alkyl groups containing 4 or fewer carbon atoms include methyl, ethyl, n-propyl, isopropyl, n-butyl, isobutyl, sec-butyl, and t-butyl.

Preferably, the rubber compositions may also contain coupling agents, such as those based on silanes. When present, the silane coupling agents contribute to the stability and physical properties of the compositions, for example, by compatibilizing or coupling the reinforcing filler with the rubber components. Silane coupling agents include those with amino, epoxy, (meth)acryl, chloro, and vinylyl functionality.

Examples of amino functional silane coupling agents include aminopropyltriethoxysilane; aminopropyltrimethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethyl aminoethyl)methyldiethoxysilane; and methyl aminopropyltrimethoxysilane. Examples of sulfur functional silane coupling agents include bis(triethoxysilylpropyl)tetrasulfide; bis(triethoxysilylpropyl)disulfide; bis (3-ethoxydimethylsilylpropyl) oligosulfur; mercaptopropyltrimethoxysilane; mercaptopropyltriethoxysilane; mercaptopropylmethyldimethoxysilane; and 3-thiocyanatopropyltriethoxysilane. Examples of epoxy silane coupling agents include: glycidoxypropyltrimethoxysilane; glycidoxypropyltriethoxysilane; glycidoxypropylmethyldiethoxysilane; and glycidoxypropylmethyldimethoxysilane. Examples of (meth)acryl silane coupling agents include: methacryloxypropyltrimethoxysilane; methacryloxypropyltriethoxysilane; and methacryloxypropylmethyldimethoxysilane. Examples of chloro silane coupling agents include: chloropropyltrimethoxysilane; chloropropyltriethoxysilane; chloromethyltriethoxysilane; chloromethyltrimethoxysilane; and dichloromethyltriethoxysilane. Examples of vinylyl silane coupling agents include: vinyltrimethoxysilane; vinyltriethoxysilane; and vinyltris(2-methoxyethoxy)silane.

It has been found that compositions containing low levels of non-petroleum oils can produce molded articles for outsoles for athletic shoes having acceptable physical properties, even in the absence of conventional silane coupling agents. Such compositions and molded articles produced from them may provide environmental and health benefits.

The rubber composition may include a colorant such as a pigment or dye. Nonlimiting examples of suitable colorants include organic and inorganic pigments. The amount of colorant used in the rubber formulation varies widely, depending upon the specific colorant or colorants used and the color desired. The rubber composition may include one or more of various other additives. Nonlimiting examples of suitable additives include antioxidants, process aids, extenders, and tackifiers. Such additives are generally included in amount of up to about 10% by weight of the total rubber composition.

The rubber compositions can be compounded in conventional rubber processing equipment. In a typical procedure, all components of the rubber composition are weighed out. The rubber and additives are then compounded in a conventional mixer such as a Banbury mixer. If desired, the compounded rubber may then be further mixed on a roller mill. At this time, it is possible to add pigments such as carbon black. The composition may be allowed to mature for a period of hours prior to the addition of sulfur and accelerators, or they may be added immediately on the roller mill. It has been found to be advantageous to add the accelerators into the Banbury mixer in the later stages of the mixing cycle. Adding the accelerators into the Banbury mixer generally improves their distribution in the rubber composition, and aids in reduction of the cure time and temperatures. In general, an elemental sulfur curing compound is not added into the Banbury mixer. Organic sulfides (sulfur donating compounds) may be added to the Banbury mixer.

The rubber composition may be formed into a sheet, typically by calendaring or extrusion, for placement in the first mold. The rubber composition sheet is approximately the thickness desired for the molded, cured rubber layer. The rubber composition sheet may be at least about 2 mm, preferably at least about 5 mm in thickness. The rubber formulation sheet may also be up to about 10 mm in thickness.

The rubber material may be foamed or blown by use of foaming or blowing agents as mentioned above.

The rubber composition is molded with a layer of the first thermoplastic composition, which will function as a tie layer to firmly attach the molded, cured rubber portion to a second thermoplastic composition. The first thermoplastic composition includes one or more thermoplastic polymers and may optionally contain additives such as pigments, fillers, antioxidants, process aids, extenders, coupling agents, silica, and tackifiers. While the polymer or polymers used in the first thermoplastic composition are generally thermoplastic in the major part of the layer, it should nonetheless be apparent that in certain embodiments that will be described there may be some crosslinking of this layer at its interface with the rubber. Nonlimiting examples of suitable thermoplastic polymers include thermoplastic elastomers, polyurethanes, polyesters, polyamides, vinyl polymers including, without limitation, copolymer of vinyl alcohol, vinyl esters, ethylene, acrylates, methacrylates, styrene, and so on, polyacrylonitrile, polyphenylene ethers, polycarbonates, and so on. Particularly useful thermoplastic polymers include styrene-butadiene-styrene (SBS) block copolymers, styrene-ethylene butylene-styrene (SEBS) block copolymers, ether-amide block copolymers, and unsaturated or millable urethane (TSE M97).

In one embodiment, the first thermoplastic composition includes a reducible chemical species susceptible to reaction with the curing agent of the rubber formulation. Nonlimiting examples of reducible chemical species include ethylenically unsaturated groups such as vinyl groups, carbonyl groups such as those forming part of urea, urethane, ketone, aldehyde, ester, and amide groups, thiocarbonyl groups, cyano groups, epoxide or other strained-ring structures, and reactive alpha hydrogens and abstractable hydrogens such as those of the arylated methylene groups of polyurethanes of 4,4'-methylenediphenylisocyanate (MDI) and alpha-methylene groups of adipate polyesters or polyester segments in polyurethanes prepared from hydroxyl-terminated adipate polyesters. Other examples of suitable materials with reducible chemical species include SBS block copolymer, polyesters of maleic anhydride or other unsaturated acids and polyurethanes prepared with such hydroxyl-functional polyesters, and acrylated or methacrylated polymers. The first thermoplastic composition may include a colorant such as a pigment or dye. Nonlimiting examples of suitable colorants include organic and inorganic pigments. The first thermoplastic composition may include one or more of various additives such as fillers, antioxidants, process aids, extenders, tackifiers, plasticizers, and so on, but the first thermoplastic composition should be free from any initiator for free radical polymerization (i.e., even when the first thermoplastic composition contains addition polymerizable moieties, it is not "cured" when the rubber is cured, instead reaction resulting in covalent bonding takes place at the interface with the rubber composition).

The first thermoplastic composition may be formed into a sheet, typically by calendaring. In general, the first thermoplastic composition sheet will be substantially less thick compared to the rubber portion of the first molded article. The first thermoplastic composition sheet should be thick enough to handle without tearing and thin enough to easily drape over the rubber The first thermoplastic composition sheet may be at least about 0.05 mm, preferably at least about 0.1 mm, more preferably at least about 0.2 mm in thickness. The first thermoplastic composition sheet may also be up to about 1 mm, preferably up to about 0.5 mm, more preferably up to about 0.3 mm in thickness.

In one embodiment, the rubber composition sheet and first thermoplastic composition sheet are place adjacent one another, and the two layers are together die cut to a desired pre-form shape. The two die-cut layers are then placed together, tie layer side up, in a mold and heated to cure the rubber formulation. In another embodiment, a pre-form shape of the rubber composition and the first thermoplastic composition may be made separately and placed in the mold, or a perform of the rubber may be placed in the mold and a layer of the first thermoplastic composition is introduced by spraying, brushing, or rolling an amount of the first thermoplastic composition or positioning a solid layer of the first thermoplastic composition in the mold over the rubber pre-form.

The mold is placed into a press and held for a specified period of time at a temperature sufficient to achieve cure. Typically, the curing time is obtained from a rheometer curve, such as conventional in the rubber processing industry. For example, the moldable rubber compositions may be cured for a time equal to T90 plus one minute, where T90 is the time required for 90% of the viscosity to develop. Typical temperatures are generally from about 145 to 165° C., and typical times can range from 3-9 minutes, though processing outside these times and temperature ranges is also possible, especially in large parts with thick cross sections. The temperature of the mold depends upon the particular curing agent used in the rubber formulation, and typically may vary from about 50° C. to about 300° C. The mold is closed under pressure and the tie layer of the first thermoplastic composition is co-molded with, and covalently bonded to, the rubber layer during the curing cycle for the rubber. The curing cycle may be, for example and without limitation, between 1 minute and 30 minutes in length depending on the thickness of the rubber layer. A ten- or fifteen-minute cycle is typical. During the curing cycle, the unsaturated groups or other reactive groups of the first thermoplastic composition react with the rubber composition at the interface of the two layers. When the reactive group of the thermoplastic composition is unsaturated carbon bonds, the amount of curing agent in the rubber must be sufficient to cause this interlayer crosslinking to take place so as to form a strong bond between the two layers. In the case of an additive such as coupling agents, the concentration of such additives at the interface must be high enough to form the desired bond strength.

The cured rubber insert having the first thermoplastic composition layer bonded on one side is removed from the rubber mold and transferred to a second mold to be molded as an insert with a second thermoplastic composition. The thermoplastic, tie layer side faces up, into the void of the mold where it will interface with the second thermoplastic composition. The mold can have a recessed cavity designed to accept the insert. After placing the insert into the mold, the mold is closed and the second thermoplastic material is injected into the mold to form an article comprising the insert.

The second thermoplastic composition molded with the insert may be any material compatible with the thermoplastic material of the insert. Nonlimiting examples of useful thermoplastic polymer for injection molding include thermoplastic polyurethanes, polyamides such as those available under the product designations Rilsan, Grilamid, Vestamid, and so on, polyether-polyamide copolymers such as those available under the product designations Pebax or Daiamid, ethylene-vinyl alcohol copolymers such as the product available under the designation Levaprene, SEBS, SBS, PEEK, ABS, poly (ester-imide) copolymers, polyesters such as polyesters sold under the designation Crastin. ester-ether block copolymers such as products sold under the designation Hytrel, and so on. The second thermoplastic composition may include any of the colorants or additives already mentioned in connection with the first thermoplastic composition. In some embodiments for footwear applications, it is desirable to use polyamide 11, polyamide 12, polyester-based or polyether-based thermoplastic polyurethanes, polyamide 6, polyamide 66, PBT, PET, PEA6, or PEE6. When the molded article is to be used as an outsole for footwear, typical additives include fillers, antioxidants and other stabilizers, process aids, extenders, and tackifiers.

The molding temperature of the second molding step should be sufficiently high to cause a melt fusion or weld and/or covalent bonding to form with the first thermoplastic layer of the insert. The polymers of the first thermoplastic composition layer and the second thermoplastic composition may covalently bond when they contain complementary reactive groups on polymers or other material in their respective compositions, such as epoxide groups in the one and carboxyl, amino, and/or hydroxyl groups in the other, or ester or urethane groups in the one and hydroxyl an/or amino groups in the other. In another example, the first thermoplastic composition may include a coupling agent having a labile hydrogen, for example from an amine group, that can react with an isocyanate group of the second thermoplastic resin or can undergo a transesterification reaction with an ester or substitution at the linking oxygen of a urethane group to form an amide or urea group covalent bond with the second thermoplastic material.

Figure 1:
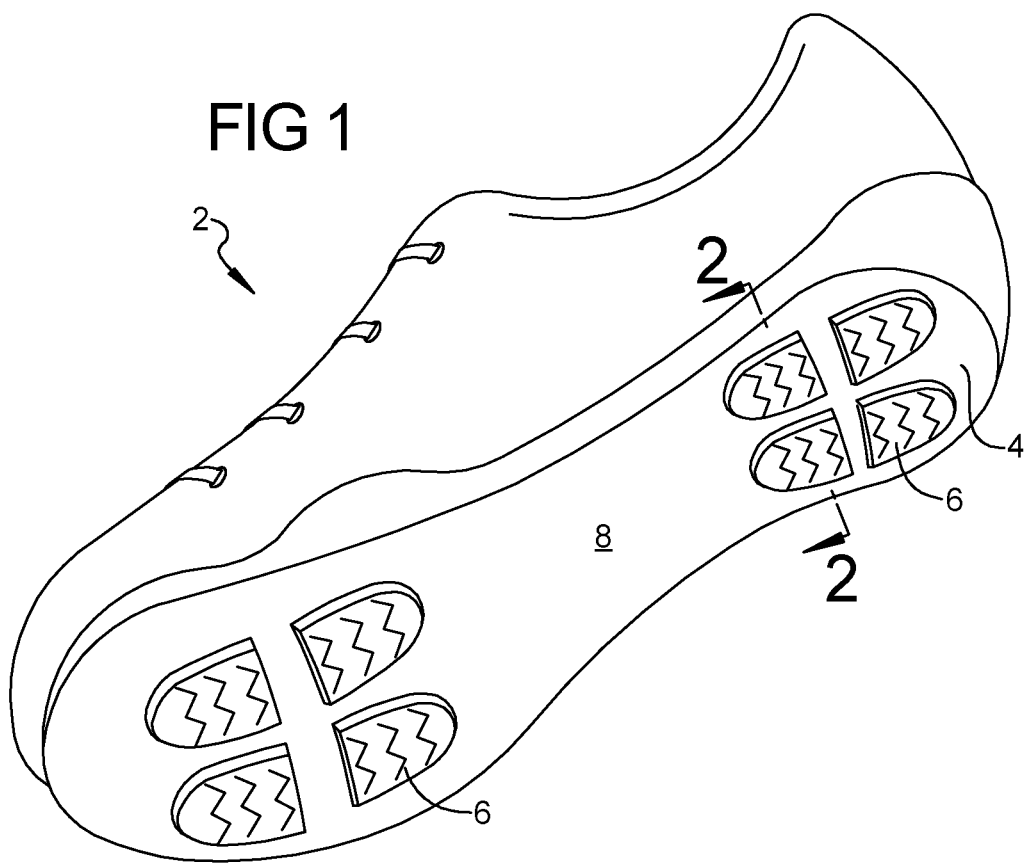
FIG. 1 is a perspective view of a shoe with outsole prepared according to this disclosed method.

The thermoplastic with molded rubber inserts may, for example, be an outsole for footwear. FIG. 1 illustrates shoe 2 having outsole 8. Outsole 8 is composed mainly of a thermoplastic material 4, but includes a number of rubber traction elements 6 located generally in the areas of contact for the sole surface of sole plate when the wearer of the footwear stands. The traction elements 6 are ridged or embossed to grip the contacted surface. The outsole is formed by the process described above, in which, in a first step, the rubber for the traction element inserts is molded and cured in a first mold that introduces the ridging or embossing on an outer surface and covalently bonds a first thermoplastic material (tie layer) on an inner surface that will contact thermoplastic material 4 (the second thermoplastic material). Then, the molded rubber traction elements 6 are inserted into a second mold where the thermoplastic material 4 is added and molded to form the outsole 8.

Figure 2:
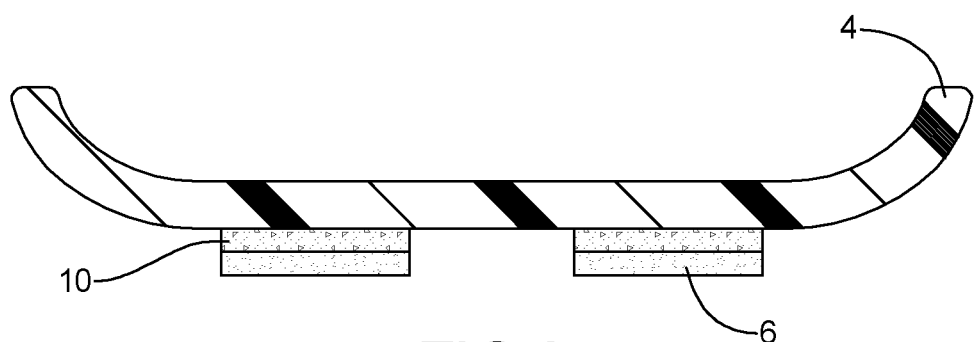
FIG. 2 is a cross-sectional view along line 2-2 of FIG. 1.

The interfaces between rubber traction elements 6 and thermoplastic material 4 are shown in FIG. 2. FIG. 2 is a cross-sectional view along line 2-2, which passes through two rubber traction elements 6 of outsole 8. Thermoplastic material 4 and rubber traction elements 8 are joined by a thermoplastic material in tie layer 10. Thermoplastic tie layer 10 comprises a thermoplastic material that is compatible with thermoplastic material 4, such that it is firmly bonded with thermoplastic material 4. Thermoplastic tie layer 10 has also formed covalent bonds at its interface with rubber traction elements 6. Rubber traction elements 6 are thus firmly held in place in outsole 8. While thermoplastic layer 10 and rubber traction element 6 are shown in FIG. 2 as having similar thicknesses, the thickness of thermoplastic layer 10 can actually be much less than that of rubber element 6.

FIG. 3A illustrates placement of a rubber segment 22 in an outsole 24 in an area underlying the toes to provide enhanced flexibility. Layers 23 of the first thermoplastic material, are interposed as tie layers between rubber segment 22 and areas 28 of the second thermoplastic material, with the layers 23 being covalently bound to rubber segment 22 at their interface and being thermally welded or covalently bound, as shown in cross-section 3B taken along line D-D of FIG. 3A. FIG. 3C shows an alternative arrangement of the interfaces of the first thermoplastic material 23 between rubber segment 22 and second thermoplastic material areas 28, in which the first thermoplastic material 23 is incorporated around a perimeter portion of the rubber segment 22 of the flex groove to improve interfacial strength between the elastic flex groove and the rigid thermoplastic sole unit.

FIG. 4A illustrates an outsole having wedge-shaped rubber segments 22a, 22b, 22c bonded to thermoplastic outsole 26 through thermoplastic tie layers 23. The outsole is again made by the process described above, so that at interfaces 28 tie layers 23 are covalently bonded to rubber segments 22a, 22b, 22c and at interfaces 29 tie layers 23 are thermally welded and/or covalently bonded to thermoplastic outsole 26. The wedge-shaped rubber segments 22a, 22b, 22c provide enhanced flexibility of the footwear outsole 26 along lines B-B and C-C. Thermoplastic tie layers 23 ensure durable bonding between thermoplastic and rubber areas. In this embodiment, the first thermoplastic material underlies and edges the rubber segment set into the thermoplastic outsole material. FIG. 4B shows a partial cross-section along line 4B-4B, showing thermoplastic tie layers 23 lying between rubber segment 22a and thermoplastic outsole 26.

This description of my technology is merely exemplary in nature and, thus, variations that do not depart from the gist of the present disclosure are intended to be within the scope of the invention. Such variations are not to be regarded as a departure from the spirit and scope of the invention.

What is claimed is:

1. An article made according to a method comprising:
   placing in a first mold a curable rubber composition;
   placing on a surface of the rubber composition a layer comprising a first thermoplastic material with unsaturated carbon-carbon bonds;
   curing the rubber composition in the first mold to form a first molded portion with the first thermoplastic material covalently bonded to the cured rubber composition;
   placing the first molded portion into a second mold, the layer facing an inside cavity of the second mold and the rubber composition facing a surface of the mold cavity;
   closing the second mold and injecting into the second mold a second thermoplastic material to form a second molded portion with the first thermoplastic material thermally bonded to the second thermoplastic material wherein the second thermoplastic material comprises a groove in which at least one rubber insert is set, having the first thermoplastic material located around a perimeter portion of the rubber insert set into the groove, wherein the second molded portion is the article.

2. An article according to claim 1, wherein the article is an article of footwear.

3. An article according to claim 2, wherein the footwear comprises an outsole, wherein said outsole comprises the second thermoplastic material and the at least one rubber insert formed of the curable rubber composition joined to the second thermoplastic material through a layer of the first thermoplastic material.

4. An article according to claim 3, wherein the rubber insert is a traction element of the outsole.

5. An article according to claim 3, wherein the rubber insert increases flexibility of the outsole.

6. An article according to claim 3, wherein the rubber insert is wedge-shaped.

* * * * *